2 Sheets--Sheet 1.
S. B. DAVIS.
Corn-Planters.
No. 147,108. Patented Feb. 3, 1874.
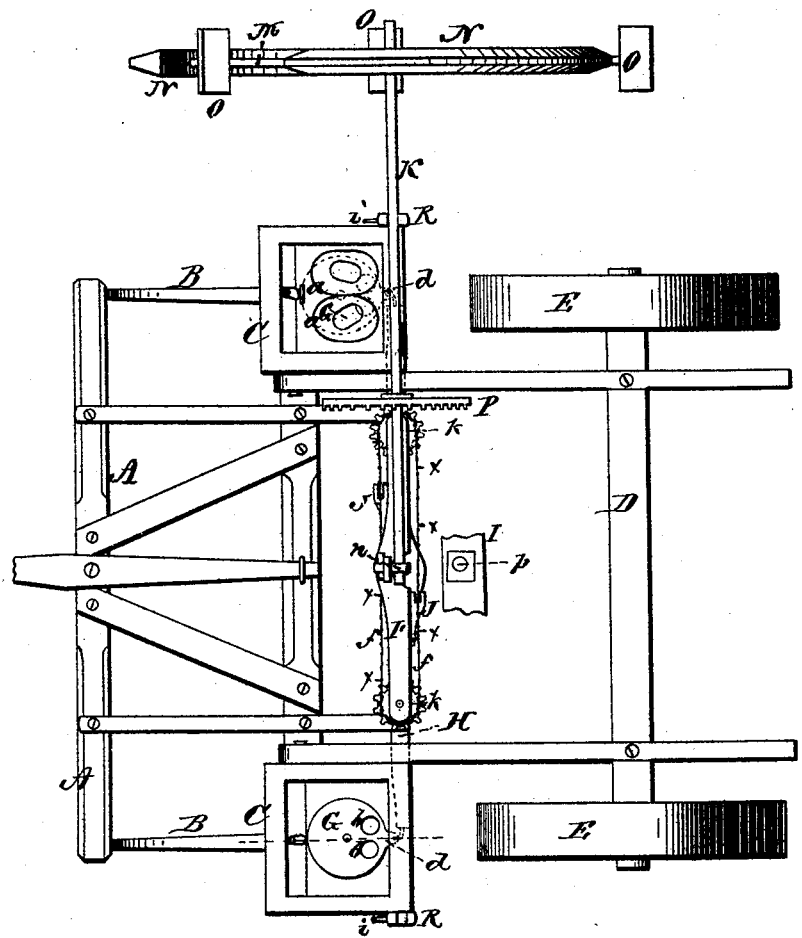
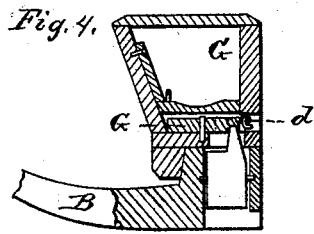
WITNESSES.
Henry N. Miller
C. L. Evert.
INVENTOR
S. B. Davis.
Alexander Mason
By
Attorneys.

S. B. DAVIS.
Corn-Planters.

No. 147,108.

2 Sheets--Sheet 2.

Patented Feb. 3, 1874.

WITNESSES.
Henry N. Miller
C. L. Everck

INVENTOR
S. B. Davis
Alexander Mason
By Attorneys.

UNITED STATES PATENT OFFICE.

SAMUEL B. DAVIS, OF HAMBURG, IOWA, ASSIGNOR OF ONE-HALF HIS RIGHT TO METCALF & BROTHER, OF SAME PLACE.

IMPROVEMENT IN CORN-PLANTERS.

Specification forming part of Letters Patent No. 147,108, dated February 3, 1874; application filed November 19, 1873.

*To all whom it may concern:*

Be it known that I, SAMUEL B. DAVIS, of Hamburg, in the county of Fremont and in the State of Iowa, have invented certain new and useful Improvements in Corn-Planters; and do hereby declare that the following is a full, clear, and exact description thereof, reference being had to the accompanying drawings and to the letters of reference marked thereon, making a part of this specification.

The nature of my invention consists in the construction and arrangement of an attachment for corn-planters for dropping the corn and checking the ground, as will be hereinafter more fully set forth.

In order to enable others skilled in the art to which my invention appertains to make and use the same, I will now proceed to describe its construction and operation, referring to the annexed drawings, in which—

Figure 2:
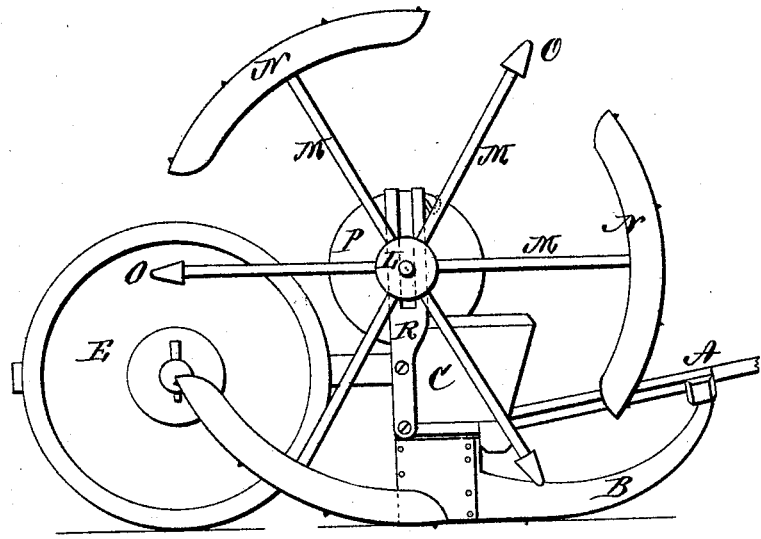
Figure 3:
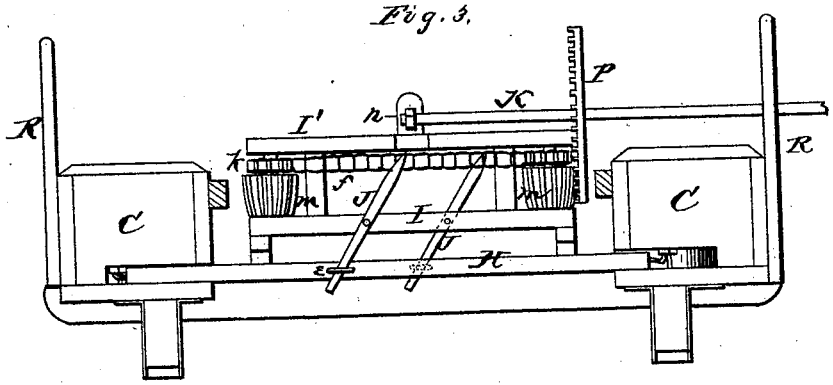

Figure 1 is a plan view of a corn-planter embodying my invention. Fig. 2 is a side elevation of the same; Fig. 3, a rear elevation with the rear part of the truck removed; and Fig. 4 is a vertical section through one of the seed-hoppers.

A represents the frame-work, with runners B B, hoppers C C, axle D, and wheels E E of a corn-planter, constructed in any of the known and usual ways. In the bottom of each hopper C are two apertures, $a\ a$, through which the corn falls down onto a circular disk, G, and into apertures $b\ b$ in the same. This disk is pivoted in the center, and, being turned a certain distance back and forth on its pivot, the apertures $b\ b$ are alternately brought over the upper end of the shoe or conductor, and the corn dropped into the ground. On the edge of the disk G, opposite the apertures $b\ b$, is a projection, $d$; and said projections on the two disks are connected by a slide, H, which passes across the frame A. On the main frame A is an additional frame, composed of two horizontal parallel bars, I I', one above the other, and connected by suitable upright posts. On opposite sides of the lower bar I are pivoted two levers, J J, the lower ends of which enter staples or loops $e\ e$, attached to the slide H, and the upper ends are operated upon by means of pins $x\ x$, projecting at suitable distance apart from an endless chain, $f$, that passes around two toothed wheels, $k\ k$, upon upright shafts in the ends of the bars I I'. On the same upright shafts are elongated pinions $m\ m$, as shown in Fig. 3.

The dropping mechanism thus constructed is operated by the following means: K represents a shaft, having its inner end placed in a swivel-eye, $n$, which is arranged in the center on top of the top bar I'. On the outer end of this shaft is a wheel, composed of a hub, L, with six radiating arms, M M, at equal distances apart. On the outer ends of alternate arms are secured segments N N, which are provided with teeth on their outer edges, so as to enter the ground and revolve the wheel and shaft when the machine moves forward. Upon the outer ends of the other alternate arms are secured markers O O, which, when the machine is in motion and the wheel revolves, mark or check the ground for the planting of the corn. On the shaft K is secured a wheel, P, which is cogged or toothed on its side, and gears with the elongated pinion $m$ at one end of the frame I I'. As the shaft K revolves, as above already described, the wheel P causes the endless chain $f$ to revolve, and the pins $x\ x$ in the same to operate the levers J J, so as to move the slide H back and forth, and thereby rock the dropping-disks G G on their pivots to drop the corn.

The shaft K may be thrown to either side, so as to bring the wheel L M N O either to the right or left of the machine, to mark or check the ground on either side desired and drop the corn, the wheel P engaging with either of the elongated pinions $m$. The shaft K is supported in a forked upright, R, and held down in the same by a pin, $i$. There is one of these forked uprights on each side attached to the hoppers C C.

In going to and from the field, the shaft K is elevated to an upright position, slid through the swiveled eye $n$, and screwed into a nut, $p$, which is embedded in the lower bar I, thereby holding the shaft firmly in this position.

Having thus fully described my invention, what I claim as new, and desire to secure by Letters Patent, is—

1. The combination, with the dropping mechanism of a corn-planter, of the slide H, with loops or staples e e, pivoted levers J J, and the endless revolving chain f, with pins x x, all constructed substantially as and for the purposes herein set forth.

2. The shaft K, with sectional checking or marking wheel L M N O and cog-wheel P, in combination with the pinions m m, wheels k k, and endless chain f, substantially as and for the purposes herein set forth.

3. The combination of the shaft K with its wheels, as described, the swivel-eye n, and nut p, substantially as and for the purposes herein set forth.

In testimony that I claim the foregoing I have hereunto set my hand this 25th day of October, 1873.

SAMUEL B. DAVIS.

Witnesses:
W. A. STOW,
J. M. HAMMOND.